US011810561B2

(12) United States Patent
Lee et al.

(10) Patent No.: US 11,810,561 B2
(45) Date of Patent: Nov. 7, 2023

(54) ELECTRONIC DEVICE FOR IDENTIFYING COMMAND INCLUDED IN VOICE AND METHOD OF OPERATING THE SAME

(71) Applicant: Samsung Electronics Co., Ltd., Suwon-si (KR)

(72) Inventors: Keuncheol Lee, Suwon-si (KR); Jaehong Kim, Suwon-si (KR); Heungryong Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/309,470

(22) PCT Filed: Apr. 29, 2021

(86) PCT No.: PCT/KR2021/005486
§ 371 (c)(1),
(2) Date: May 28, 2021

(87) PCT Pub. No.: WO2022/055068
PCT Pub. Date: Mar. 17, 2022

(65) Prior Publication Data
US 2022/0101846 A1 Mar. 31, 2022

(30) Foreign Application Priority Data
Sep. 11, 2020 (KR) .......................... 10-2020-0117122

(51) Int. Cl.
*G10L 15/22* (2006.01)
*H04R 1/40* (2006.01)
*G10L 25/51* (2013.01)

(52) U.S. Cl.
CPC .............. *G10L 15/22* (2013.01); *G10L 25/51* (2013.01); *H04R 1/406* (2013.01); *G10L 2015/223* (2013.01)

(58) Field of Classification Search
CPC ..... G10L 15/22; G10L 25/51; G10L 2015/223
See application file for complete search history.

(56) References Cited

U.S. PATENT DOCUMENTS 10,616,726 B1 * 4/2020 Freeman, II ............ H04W 8/02
10,715,528 B1 * 7/2020 Leblang .................. H04W 4/02
(Continued)

FOREIGN PATENT DOCUMENTS

KR   10-2014-0042273 A   4/2014
KR   10-2019-0075870 A   7/2019
(Continued)

OTHER PUBLICATIONS

Written Opinion of the International Searching Authority dated Aug. 10, 2021 in connection with International Patent Application No. PCT/KR2021/005486, 9 pages.
(Continued)

*Primary Examiner* — Mark Villena

(57) ABSTRACT

An electronic device includes a communication module, a plurality of microphones, and a processor. The processor is configured to identify a position of a sound source based on a voice received through the plurality of microphones, identify whether the position of the sound source is included in a first zone between the electronic device and an access point that transmits and receives a communication signal with the electronic device, identify whether the voice has been uttered by a user based on a comparison between the communication signal and a preset communication signal, when the position of the sound source is included in the first zone, and determine whether to execute a command included in the voice based on the identification of whether the voice has been uttered by the user.

15 Claims, 15 Drawing Sheets

(56) References Cited

U.S. PATENT DOCUMENTS

| | | | |
|---|---|---|---|
| 10,735,411 B1* | 8/2020 | Hardt | H04L 67/52 |
| 2012/0252430 A1 | 10/2012 | Imes et al. | |
| 2014/0095177 A1 | 4/2014 | Kim | |
| 2015/0086034 A1* | 3/2015 | Lombardi | G06F 3/165 |
| | | | 381/81 |
| 2017/0076720 A1* | 3/2017 | Gopalan | G10L 15/22 |
| 2018/0268814 A1* | 9/2018 | SaganeGowda | G10L 15/063 |
| 2019/0281341 A1* | 9/2019 | Lawrence | H04N 21/41265 |
| 2019/0385594 A1 | 12/2019 | Park et al. | |
| 2019/0392834 A1 | 12/2019 | Yi et al. | |
| 2020/0090663 A1 | 3/2020 | Watanabe | |
| 2020/0104018 A1 | 4/2020 | Coffman et al. | |
| 2020/0227034 A1* | 7/2020 | Summa | G10L 15/22 |
| 2020/0402516 A1* | 12/2020 | Trim | G10L 17/22 |
| 2021/0004200 A1* | 1/2021 | Swaminathan | G06F 3/011 |

FOREIGN PATENT DOCUMENTS

| | | |
|---|---|---|
| KR | 10-2019-0084003 A | 7/2019 |
| KR | 10-2019-0096860 A | 8/2019 |

OTHER PUBLICATIONS

International Search Report dated Aug. 10, 2021 in connection with International Patent Application No. PCT/KR2021/005486, 3 pages.

* cited by examiner

ELECTRONIC DEVICE FOR IDENTIFYING COMMAND INCLUDED IN VOICE AND METHOD OF OPERATING THE SAME

CROSS-REFERENCE TO RELATED APPLICATIONS

This application is a 371 National Stage of International Application No. PCT/KR2021/005486, filed Apr. 29, 2021, which claims priority to Korean Patent Application No. 10-2020-0117122, filed on Sep. 11, 2020, the disclosures of which are herein incorporated by reference in their entirety.

BACKGROUND

1. Field

The disclosure relates to an electronic device that identifies a command included in voice and a method of operating the same.

2. Description of Related Art

With the recent development of digital technology, various types of electronic devices have been widely used, such as mobile communication terminals, personal digital assistants (PDAs), electronic notebooks, smart phones, tablet personal computers (PCs), and wearable devices. In order to support and enhance functions of the electronic devices, the hardware part and/or the software part of the electronic devices are being continuously improved.

An artificial intelligence (AI) system is a computer system that implements human-level intelligence, in which a machine learns, makes decisions, and becomes smarter on its own, compared to existing rule-based smart systems. As the AI system is used more, it has an increased recognition rate and identifies users' tastes more accurately. Accordingly, the existing rule-based smart systems are gradually being replaced by deep learning-based AI systems.

The AI technology is composed of machine learning (deep learning) and machine learning-based element technologies. Machine learning is an algorithm technology of autonomously classifying/learning the features of input data, and the element technologies simulate functions such as cognition and judgment of the human brain by a machine learning algorithm such as deep learning. The element technologies include technical fields such as linguistic understanding, visual understanding, reasoning/prediction, knowledge expression, and motion control.

Electronic devices provide various services (or functions) by combining speech recognition technology with the AI technology. The speech recognition technology may include, for example, a technology of converting an acoustic speech signal that an electronic device obtains from a sound sensor such as a microphone into words or sentences. In the speech recognition technology, noise is generally canceled after an acoustic speech signal is extracted, and then the features of the speech signal are extracted and compared with a speech model database (DB), for speech recognition. The electronic devices provide various convenience services based on a user's voice command, such as mobile search, schedule management, making a phone call, memo, or playing music. For example, an electronic device may start a speech recognition service based on a voice wake-up method. According to an embodiment, the electronic device uses a specific voice command (for example, a word) as a wake word (or wake-up word), without performing speech recognition for the user's utterance before the wake word is received. The wake word may be, for example, the name of the electronic device (or the name of an agent (or AI) of the electronic device).

Recently, a speaker used for listening to music or listening to radio is evolving toward a smart tool that thinks and manages beyond a simple audio device that delivers sound by meeting the AI technology that realizes human abilities of learning, reasoning, perception, and natural language understanding through computer programs. For example, the speaker may function as an AI speaker that thinks and manages beyond a tool that simply transmits sound, using the AI technology such as "speech recognition", "natural language processing", and "recommendation".

The AI speaker may malfunction due to sound output from a home device such as a TV, a radio, or a telephone, not from an actual user. For example, the AI speaker may wake up by voice output from the home device.

SUMMARY

According to various embodiments, provided are electronic devices that determines whether to execute a voice command based on the position of a user identified by a change in the pattern of a communication signal and the position of a sound source identified by a plurality of microphones, and a method of operating the same.

According to various embodiments, an electronic device includes a communication module, a plurality of microphones, and a processor. The processor is configured to identify a position of a sound source based on a voice received through the plurality of microphones, identify whether the position of the sound source is included in a first zone between the electronic device and an access point that transmits and receives a communication signal with the electronic device, identify whether the voice has been uttered by a user based on a comparison between the communication signal and a preset communication signal, when the position of the sound source is included in the first zone, and determine whether to execute a command included in the voice based on the identification of whether the voice has been uttered by the user.

According to various embodiments, a method of operating an electronic device includes identifying a position of a sound source based on a voice received through a plurality of microphones included in the electronic device, identifying whether the position of the sound source is included in a first zone between the electronic device and an access point that transmits and receives a communication signal with the electronic device, identifying whether the voice has been uttered by a user based on a comparison between the communication signal and a preset communication signal, when the position of the sound source is included in the first zone, and determining whether to execute a command included in the voice based on the identification of whether the voice has been uttered by the user.

According to various embodiments, an electronic device includes a memory and a processor. The memory stores instructions that when executed, cause the processor to identify a position of a sound source based on a voice received through a plurality of microphones included in the electronic device, identify whether the position of the sound source is included in a first zone between the electronic device and an access point that transmits and receives a communication signal with the electronic device, identify whether the voice has been uttered by a user based on a comparison between the communication signal and a preset communication signal, when the position of the sound source is included in the first zone, and determine whether to execute a command included in the voice based on the identification of whether the voice has been uttered by the user.

According to various embodiments of the disclosure, an electronic device may determine whether to execute a voice command based on the position of a user identified by a change in the pattern of a communication signal and the position of a sound source identified by a plurality of microphones. Therefore, the electronic device may identify whether the voice command has been spoken by a user, without capturing with a camera or using the location function of a smartphone.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to more fully understand the drawings cited in the detailed description of the disclosure, a detailed description of each drawing is provided. In the drawings.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
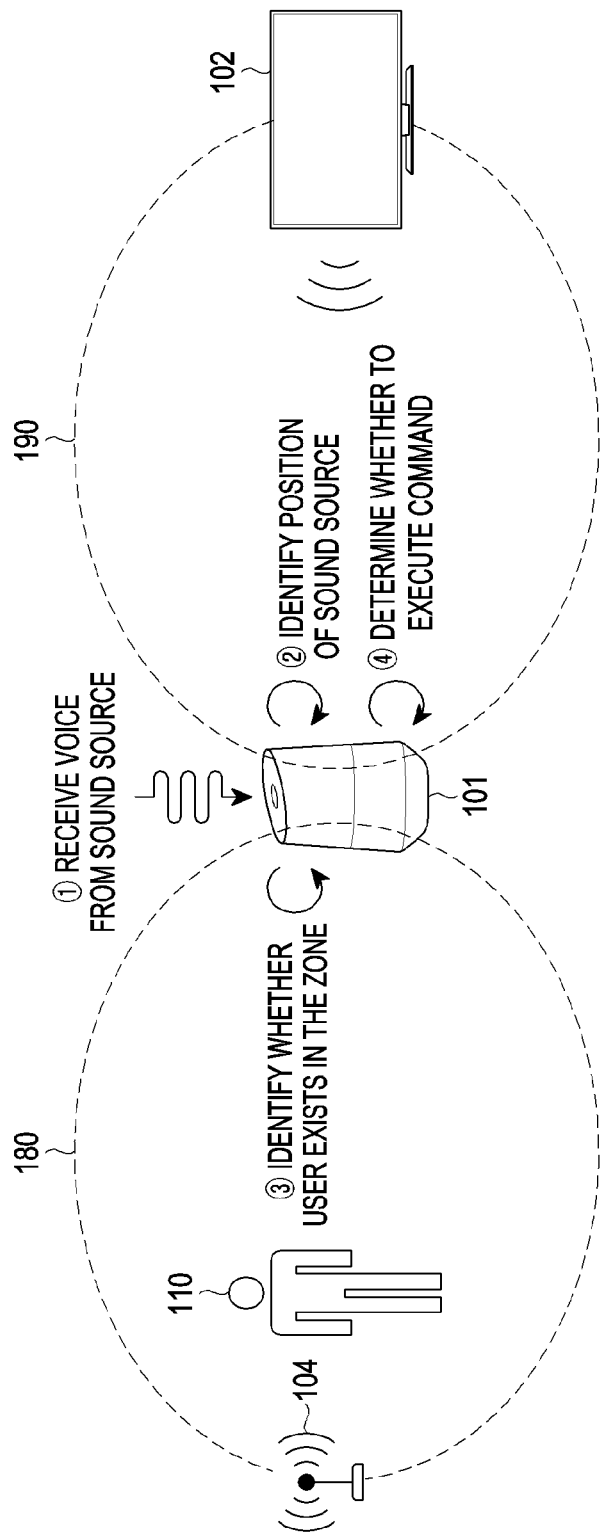
FIG. 1 is a diagram illustrating an electronic system according to various embodiments.

FIG. 1 illustrates an electronic system according to various embodiments.

Referring to FIG. 1, the electronic system may include a first electronic device 101, a second electronic device 102, and a third electronic device 104.

According to various embodiments, the first electronic device 101 may receive communication signals of a wireless communication technology from a plurality of external electronic devices (e.g., the second electronic device 102 and the third electronic device 104).

According to various embodiments, the first electronic device 101 may locate the plurality of external electronic devices (for example, the second electronic device 102 and the third electronic device 104). For example, the first electronic device 101 may identify the position of the second electronic device 102 by the communication signal received from the second electronic device 102 and the position of the third electronic device 104 by the communication signal received from the third electronic device 104. For example, the first electronic device 101 may identify the position of each electronic device 102 or 104 based on the strength (for example, received signal strength indicator (RSSI)) of the communication signal received from the electronic device 102 or 104. The first electronic device 101 may store information about the identified position of the electronic device 102 or 104.

According to various embodiments, the first electronic device 101 may receive voice from an external source and determine whether the received voice includes a command that commands execution of a function of the first electronic device 101 in the received voice. Further, the first electronic device 101 may identify the position of the sound source from which the voice has been output.

According to various embodiments, the first electronic device 101 may analyze the communication signal received from at least one of the plurality of external electronic devices (for example, the second and third electronic devices 102 and 104) and the position of the sound source to determine whether the voice has been uttered by a user. Further, the first electronic device 101 may determine whether to execute the command included in the voice according to the result of the determination.

Figure 2:
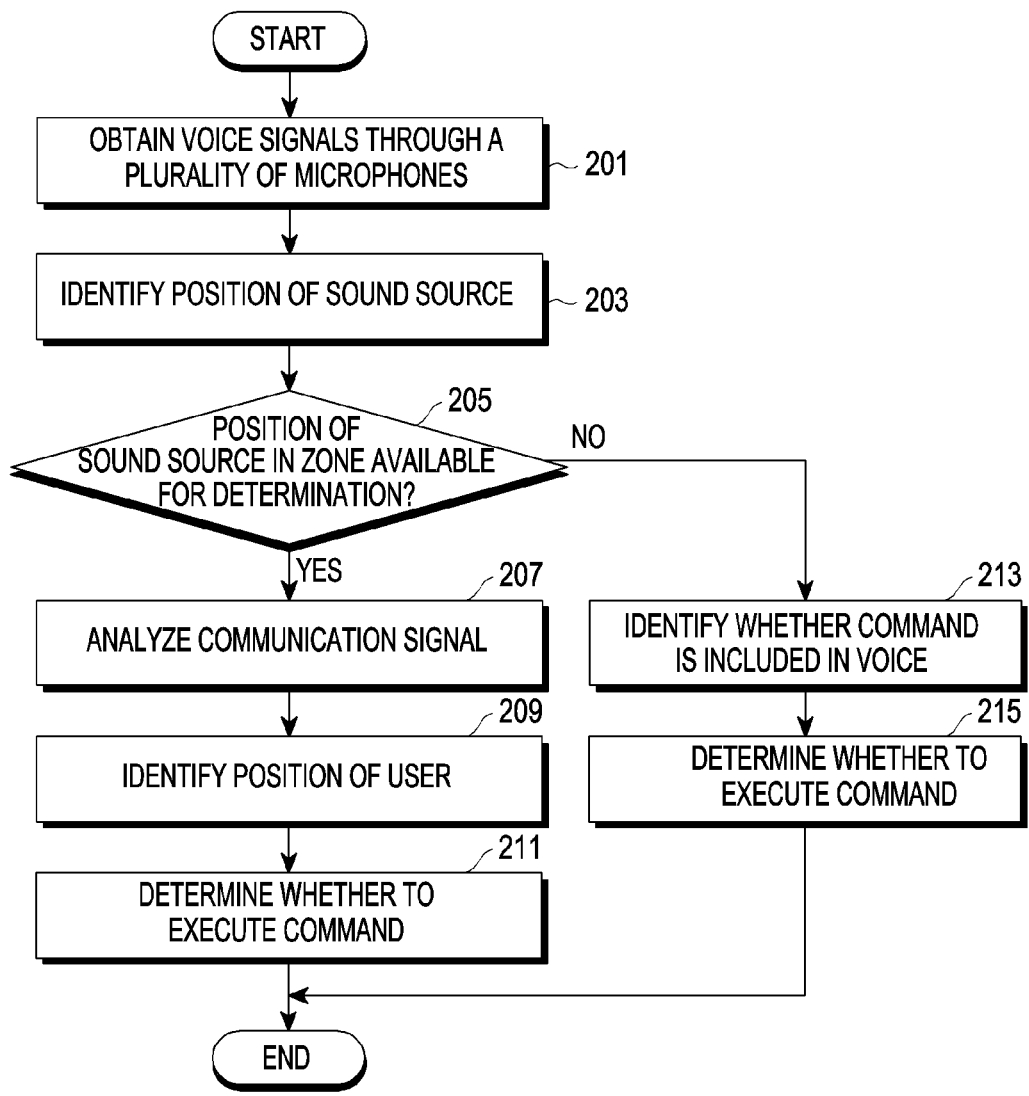
FIG. 2 is a flowchart illustrating an operation of a first electronic device according to various embodiments.

FIG. 2 is a flowchart illustrating an operation of a first electronic device according to various embodiments.

Referring to FIG. 2, according to various embodiments, the first electronic device 101 may receive an external voice through a plurality of microphones included in the first electronic device 101 in operation 201.

According to various embodiments, in operation 203, the first electronic device 101 may identify the position of a sound source from which the voice has been output based on the voice received through the plurality of microphones. For example, the first electronic device 101 may identify the direction (for example, the direction of a specific angle) of the sound source and the distance (for example, specific distance) of the sound source from the first electronic device 101 based on the intensity of the voice received at each of the plurality of microphones. The first electronic device 101 may determine the position of the sound source based on the direction (or angle) in which the sound source is located with respect to the first electronic device 101 and the distance from the first electronic device 101.

According to various embodiments, in operation 205, the first electronic device 101 may identify whether the determined position of the sound source is included in a zone available for determination. For example, the first electronic device 101 may identify whether the determined position of the sound source is included in a first zone 180, a second zone 190, or a third zone (not shown) other than the first and second zones 180 and 190. For example, the first zone 180 may be an area within a first angle range and a first distance range from the first electronic device 101. The second zone 190 may be an area within a second angle range and a second distance range from the first electronic device 101. For example, the first zone 180 and the second zone 190 may be different from each other. For example, the third zone other than the first zone 180 and the second zone 190 may be an area in which it is not possible to determine whether a user 110 exists by a communication signal.

According to various embodiments, in operation 207, when the determined position of the sound source is in a zone available for determination, the first electronic device 101 may analyze a first communication signal.

According to various embodiments, in operation 209, the first electronic device 101 may locate the user by analyzing the first communication signal. For example, the first communication signal may be a communication signal (for example, a wireless fidelity (Wi-Fi) communication signal) received from the third electronic device 104. For example, the first electronic device 101 may determine whether the user 110 exists in the first zone 180 including a path through which the first communication signal is received from the third electronic device 104, based on the result of analyzing the first communication signal. For example, when the pattern of the first communication signal is different from the pattern of a preset communication signal, the first electronic device 101 may determine that the user 110 exists in the first zone 180. For example, the pattern of the preset communication signal may be that of a communication signal in the absence of the user 110 in the path through which the first communication signal is received from the third electronic device 104. For example, when the user 110 exists in an area other than the first zone 180, the first electronic device 101 may receive the first communication signal in a pattern identical or similar to that of the preset communication signal.

According to various embodiments, the first electronic device 101 may identify which user the user 110 existing in the first zone 180 is by analyzing the pattern of the first communication signal. For example, the first electronic device 101 may prestore the pattern of a first communication signal which is generated in the presence of a specific user in the first zone 180. Then, upon receipt of a first communication signal having an identical or similar pattern to that of the stored first communication signal, the first electronic device 101 may determine that the specific user exists in the first zone 180.

According to various embodiments, when the position of the sound source is included in the first zone 180, the first electronic device 101 may compare the communication signal received from the third electronic device 104 with the preset communication signal. The electronic device 101 may determine whether the user 110 exists in the first zone 180 based on the comparison.

According to various embodiments, when the pattern of the communication signal received from the third electronic device 104 is not identical or similar to the pattern of the preset communication signal, the first electronic device 101 may determine that the user 110 exists in the first zone 180. When determining that the user 110 exists in the first zone 180, the first electronic device 101 may determine that the position of the sound source matches the position of the user 110.

According to various embodiments, in operation 211, the first electronic device 101 may determine whether to execute the command included in the voice. The first electronic device 101 may compare a voice signal corresponding to the received voice with a voice signal of a user pre-registered in the first electronic device 101. The first electronic device 101 may determine whether the voice has been uttered by the preregistered user according to the result of the comparison. For example, when the voice signal corresponding to the voice is identical or similar to the voice signal of the preregistered user, the first electronic device 101 may determine that the voice has been uttered by the preregistered user. The first electronic device 101 may execute a function (for example, wake-up function) corresponding to the command included in the voice.

According to various embodiments, when determining that the voice has not been uttered by the user, the first electronic device 101 may not execute the command included in the voice. For example, when the pattern of the communication signal received from the third electronic device 104 is identical or similar to the pattern of the preset communication signal or when the voice signal corresponding to the voice is not identical or similar to the voice signal of the user preregistered in the first electronic device 101, the first electronic device may determine that the voice has not been uttered by the user. The first electronic device 101 may not execute the function (for example, wake-up function) corresponding to the command included in the voice. For example, when the first electronic device 101 determines that the voice is sound output through the second electronic device 102 (for example, a TV), the first electronic device 101 may not execute the function corresponding to the command included in the voice.

According to various embodiments, when the position of the sound source is included in the second zone 190, the first electronic device 101 may compare a communication signal received from the second electronic device 102 with a preset communication signal. The electronic device 101 may determine whether the user 110 exists in the second zone 190 based on the comparison.

According to various embodiments, when determining that the user 110 exists in the second zone 190, the first electronic device 101 may determine that the position of the sound source matches the position of the user 110. However, since sound may be output from the second electronic device 102 in the second zone 190, the first electronic device 101 may compare the voice signal corresponding to the received voice with the voice signal of the user preregistered in the first electronic device 101. The first electronic device 101 may determine whether the voice has been uttered by the preregistered user according to the result of the comparison. When the voice has been uttered by the preregistered user, the first electronic device 101 may execute the function (for example, wake-up function) corresponding to the command included in the voice. On the other hand, when determining that the voice is sound output from the second electronic device 102 (for example, TV), the first electronic device 101 may not execute the function corresponding to the command included in the voice.

According to various embodiments, when identifying that the user 110 does not exist in the second zone 190, the first electronic device 101 may determine that the voice has not been uttered by the user 110. The first electronic device 101 may not execute the function (for example, wake-up function) corresponding to the command included in the voice. For example, when the first electronic device 101 determines that the voice is sound output from the second electronic device 102 (for example, TV), the first electronic device 101 may not execute the function corresponding to the command included in the voice.

According to various embodiments, in operation 213, when determining that the position of the sound source is in a zone unavailable for determination, the first electronic device 101 may identify whether a command is included in the voice without comparing the first communication signal with the preset communication signal. For example, when the position of the sound source is included in the third zone other than the first zone 180 and the second zone 190, the first electronic device 101 may determine whether a command is included in the voice without comparing the first communication signal with the preset communication signal.

According to various embodiments, in operation 215, when a command is included in the voice, the first electronic device 101 may determine whether to execute the command. For example, the first electronic device 101 may compare the voice signal corresponding to the voice with the voice signal of the preregistered user, and execute the function corresponding to the command included in the voice according to the result of the comparison. This may be because the first electronic device 101 is not capable of determining whether the user 110 exists in the third zone by a communication signal. Accordingly, when a command is included in the voice, the first electronic device 101 may execute a function corresponding to the command by comparing the received voice with the preregistered user's voice.

According to various embodiments, when the user's voice is not preregistered, and when a command is included in the voice, the first electronic device 101 may execute a function corresponding to the command included in the voice.

According to various embodiments, the second electronic device 102 may output sound including voice. For example, the second electronic device 102 may include various types of home devices. The second electronic device 102 may transmit and receive signals to and from the first electronic device 101 and/or the third electronic device 104.

According to various embodiments, the third electronic device 104 may be a device serving as an access point. For example, the third electronic device 104 may be implemented as a Wi-Fi signal sharer or an electronic device supporting a mobile hotspot function.

Figure 3:
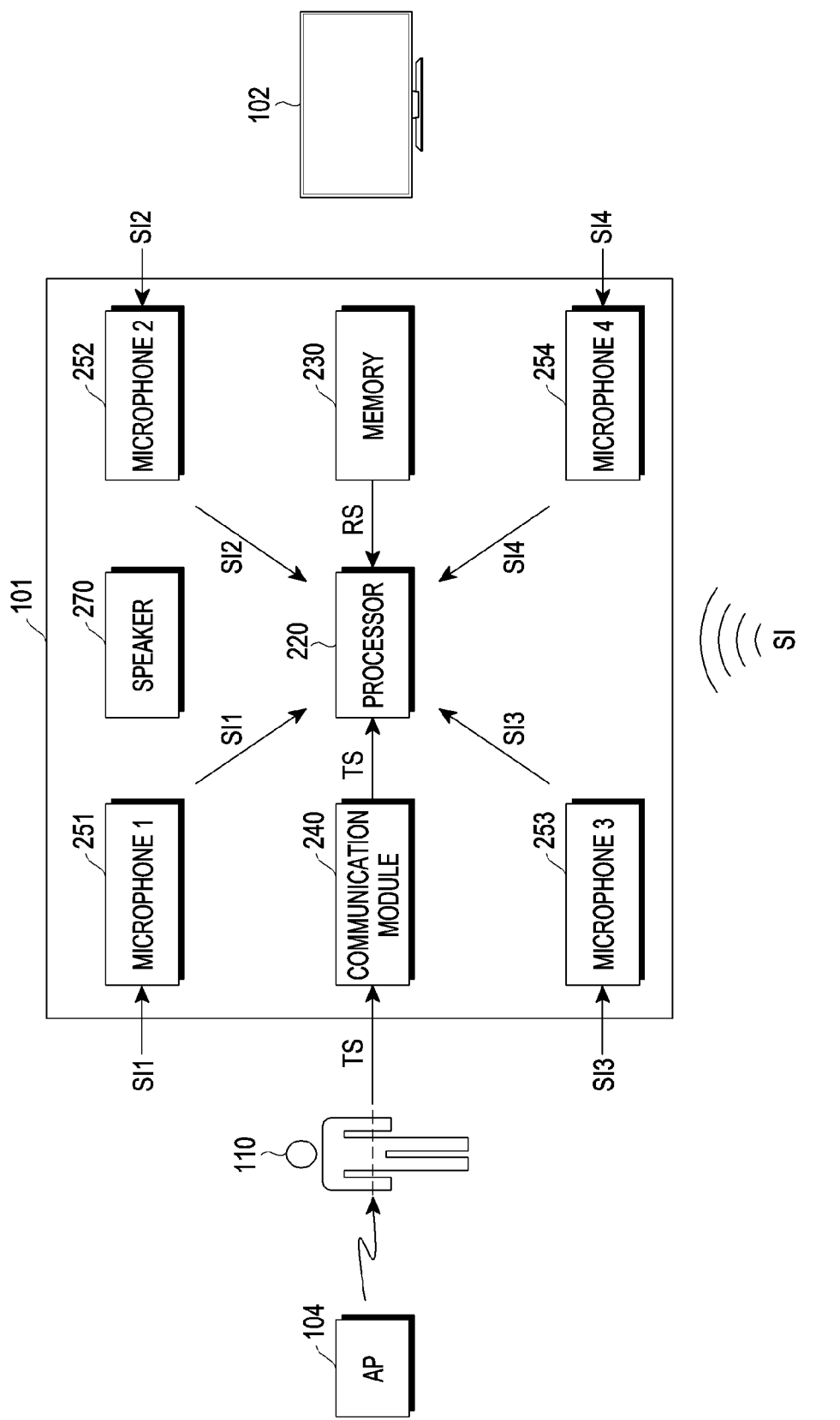
FIG. 3 is a block diagram illustrating a first electronic device according to various embodiments.

FIG. 3 is a block diagram illustrating a first electronic device according to various embodiments.

Referring to FIG. 3, the first electronic device 101 may include a processor 220, a memory 230, a communication module 240, a plurality of microphones 251 to 254, and a speaker 270.

According to various embodiments, the processor 220 may provide overall control to the first electronic device 101.

According to various embodiments, the processor 220 may receive voice SI through the plurality of microphones 251 to 254. For example, the plurality of microphones 251 to 254 may receive voice SI1 to voice SI4 of different strengths for the same voice SI according to the positions of the microphones 251 to 254 on the first electronic device 101 and obtain voice signals SI1 to SI4 corresponding to the voice SI1 to the voice SI4. The processor 220 may identify the position of a sound source based on the voice signals SI1 to SI4 received respectively through the first microphone 251, the second microphone 252, the third microphone 253, and the fourth microphone 254. For example, the processor 220 may determine the direction (or angle) in which the sound source is located with respect to the first electronic device 101 and the distance of the sound source from the first electronic device 101. Further, the processor 220 may determine the position of the sound source based on the determined direction and distance.

Although the first electronic device 101 is shown in FIG. 3 as including four microphones, this is merely exemplary, and the number or arrangement of the microphones may not be limited thereto.

According to various embodiments, the processor 220 may identify whether the position of the sound source is included in the first zone 180 or the second zone 190. The processor 220 may also identify whether the position of the sound source is included in the third zone other than the first zone 180 and the second zone 190.

According to various embodiments, when determining that the position of the sound source is in the first zone 180, the processor 220 may compare a first communication signal TS received from the third electronic device 104 with a prestored communication signal RS. When the first communication signal TS is identical or similar to the prestored communication signal RS, the processor 220 may determine that the user 110 does not exist in the first zone 180. Alternatively, when the first communication signal TS is not identical or similar to the prestored communication signal RS, the processor 220 may determine that the user 110 exists in the first zone 180. For example, the prestored communication signal RS may be a communication signal received from the third electronic device 104 without user interference. For example, referring to FIG. 6B, the prestored communication signal RS may be different from a communication signal TS1 or TS2 received with interference from a user 111 or 112. The communication signal RS of FIG. 6B(a) may be a communication signal received from the third electronic device 104 without user interference. On the other hand, the communication signal TS1 or TS2 of FIG. 6B(b) or 6B(c) may be a communication signal received from the third electronic device 104, with interference from the user 111 or 112.

According to various embodiments, when identifying that the user 110 does not exist in the first zone 180, the processor 220 may determine that the voice SI has not been uttered by the user 110. The processor 220 may not execute a function (for example, wake-up function) corresponding to a command included in the voice SI.

According to various embodiments, when identifying that the user 110 exists in the first zone 180, the processor 220 may determine that there is a possibility that the voice SI has been uttered by the user 110. The processor 220 may compare at least one of the voice signals SI1 to SI4 corresponding to the voice SI with a voice signal of a user prestored in the memory 230. The processor 220 may determine whether the voice SI has been uttered by the user according to the result of the comparison. For example, when at least one of the voice signals SI1 to SI4 corresponding to the voice SI is identical or similar to the voice signal of the user, the processor 220 may determine that the voice SI has been uttered by the user. The processor 220 may identify whether a command for executing a function (for example, wake-up function) of the first electronic device 101 is included in the voice SI. When the command is included in the voice SI, the processor 220 may execute the function (for example, wake-up function) corresponding to the command.

According to various embodiments, the processor 220 may indicate to the user through the speaker 270 that the function corresponding to the command is executed. For example, when the wake-up function is executed, the processor 220 may output sound indicating a wake-up state.

Figure 4:
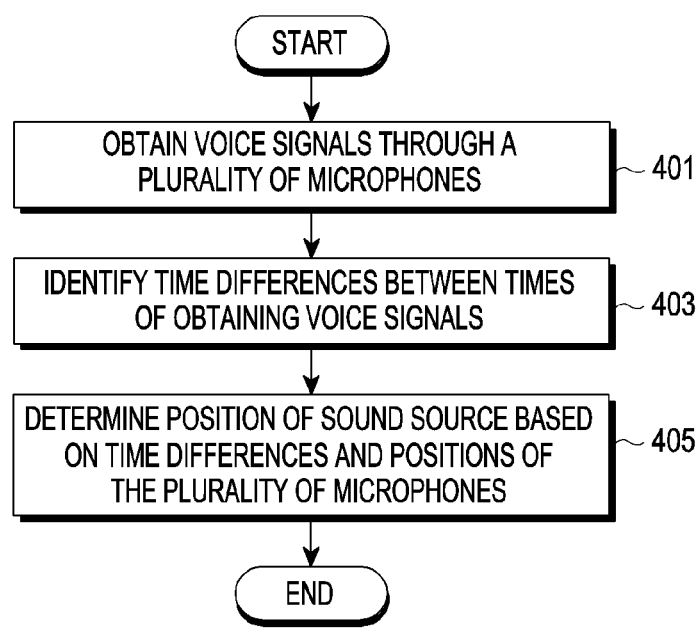
FIG. 4 is a flowchart illustrating a method of identifying the position of a sound source by a first electronic device according to various embodiments.

FIG. 4 is a flowchart illustrating a method of identifying the position of a sound source by a first electronic device according to various embodiments.

Referring to FIG. 4, according to various embodiments, the first electronic device (for example, the first electronic device 101 in FIG. 1) may obtain voice signals through a plurality of microphones (for example, the plurality of microphones 251 to 254 in FIG. 3) in operation 401. The first electronic device 101 may cancel noise in the voice signals.

According to various embodiments, the first electronic device 101 may identify the time differences between times when the voice signals have been obtained in operation 403.

In operation 405, the first electronic device 101 may identify the position of a sound source from which the voice has been output based on the time differences and the positions of the plurality of microphones 251 to 254. The first electronic device 101 may prestore the positions of the plurality of microphones 251 to 254. The first electronic device 101 may identify the position of the sound source by further considering the strength of the voice signal obtained by each of the plurality of microphones 251 to 254.

Figure 5:
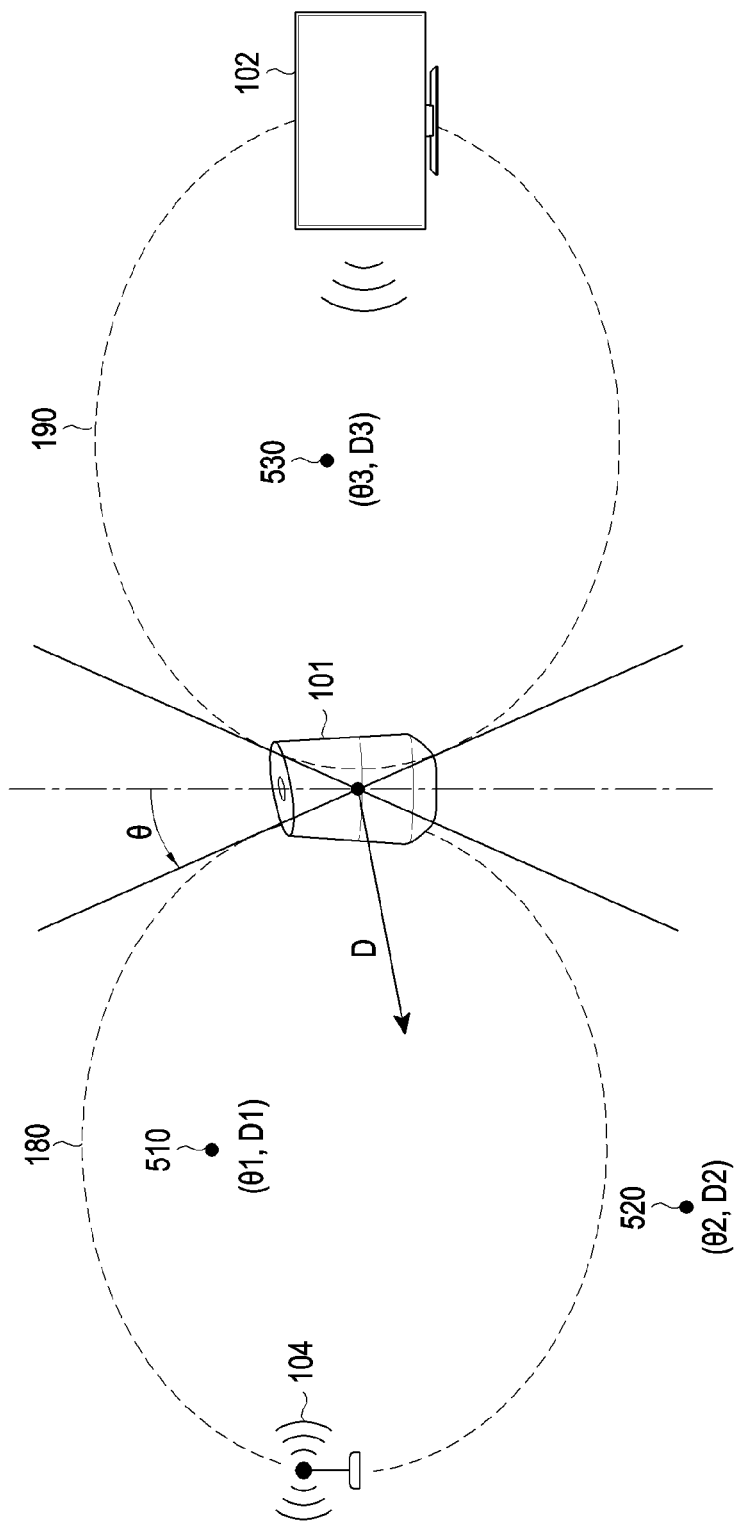
FIG. 5 is a diagram illustrating a method of identifying the position of a sound source by a first electronic device according to various embodiments.

FIG. 5 is a diagram illustrating a method of identifying the position of a sound source by a first electronic device according to various embodiments.

Referring to FIG. 5, the first electronic device 101 may identify the position of a sound source based on an angle θ and a distance D. For example, the first electronic device 101 may identify a first point 510 by a first angle θ1 and a first distance D1, a second point 520 by a second angle θ2 and a second distance D2, and a third point 530 by a third angle θ3 and a third distance D3.

According to various embodiments, the first electronic device 101 may identify whether a user exists by analyzing a communication signal only within a specific angle range and a specific distance range. For example, the first electronic device 101 may store information about an angle range and distance range corresponding to the first zone 180 and the second zone 190. For example, when identifying the position of the sound source as the first point 510 or the third point 530, the first electronic device 101 may analyze the communication signal to determine whether the user exists. On the other hand, when identifying the position of the sound source as the second point 520, the first electronic device 101 may determine whether the user exists by analyzing a communication signal.

Figure 6A:
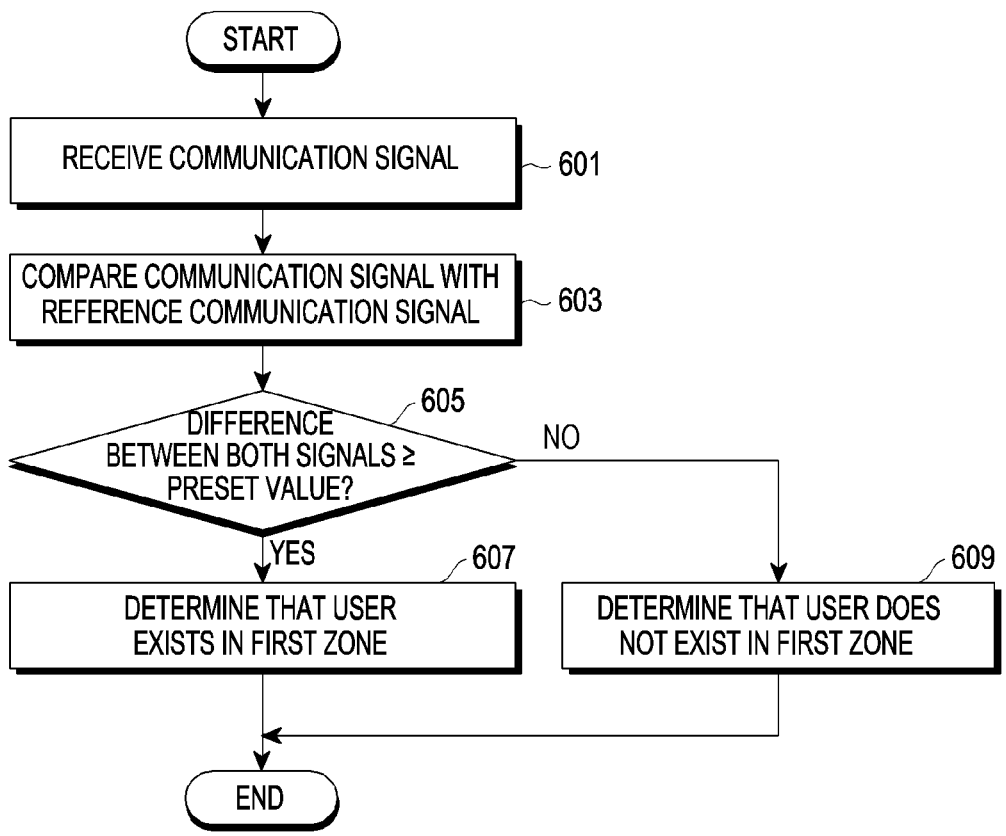
FIGS. 6A and 6B are drawings illustrating a method of analyzing a communication signal by a first electronic device according to various embodiments.
Figure 6B:
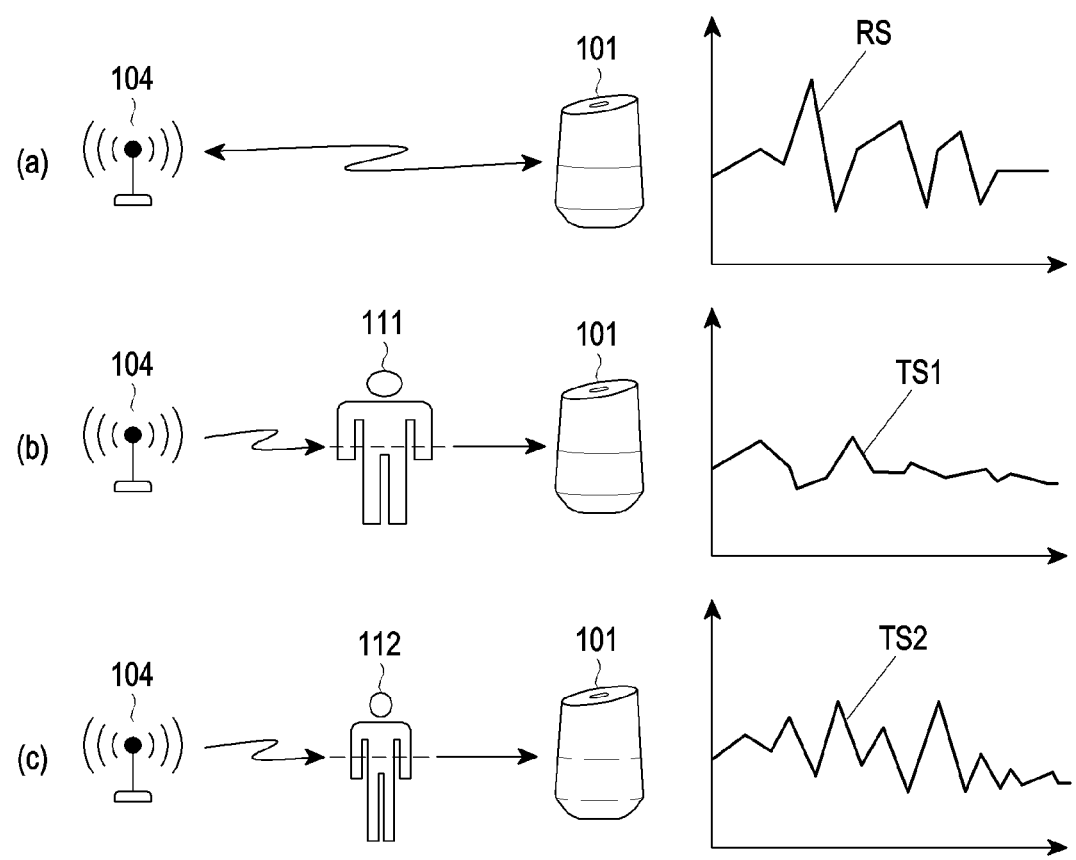

FIGS. 6A and 6B are diagrams illustrating a method of analyzing a communication signal by a first electronic device according to various embodiments.

Referring to FIG. 6A, according to various embodiments, the first electronic device (for example, the first electronic device 101 in FIG. 1) may receive a communication signal from the third electronic device 104 in operation 601. For example, the communication signal may be a signal related to Wi-Fi communication technology.

According to various embodiments, the first electronic device 101 may compare the communication signal received from the third electronic device 104 with a reference communication signal stored in a memory (for example, the memory 230 in FIG. 3) in operation 603. For example, the reference communication signal may be a communication signal received from the third electronic device 104, when a user does not exist in a first zone (for example, the first zone 180 in FIG. 1).

According to various embodiments, the first electronic device 101 may identify the difference between the two signals (the communication signal and the reference communication signal) and identify whether the difference is equal to or greater than a preset value in operation 605. For example, the first electronic device 101 may identify the difference between the two signals in a specific frequency band. For example, the preset value may be a value used to determine whether a user exists in the first zone 180. For example, the preset value may be automatically set by a processor (for example, the processor 220 in FIG. 3) or may be set by a user input.

According to various embodiments, when the difference between the two signals is equal to or greater than the preset value (Yes in operation 605), the first electronic device 101 may determine that the user exists in the first zone 180 in operation 607.

According to various embodiments, when the difference between the two signals is less than the preset value (No in operation 605), the first electronic device 101 may determine that the user does not exist in the first zone 180 in operation 609.

According to various embodiments, the processor 220 may also determine which user exists in the first zone 180 by analyzing the pattern of the first communication signal TS. For example, referring to FIG. 6B(a), the processor 220 may obtain the prestored reference communication signal RS to determine which user exists in the first zone 180. The processor 220 may determine which user exists in the first zone 180 based on the difference between the first communication signal TS and the prestored communication signal RS. For example, when the processor 220 receives a communication signal TS1 having a relatively large difference from the prestored reference communication signal RS as illustrated in FIG. 6B(b), the processor 220 may determine that a user with a large physique exists in the first zone 180. Further, when the processor 220 receives the communication signal TS2 having a relatively small difference from the prestored reference communication signal RS as illustrated in of FIG. 6B(c), the processor 220 may determine that a user with a small physique exists in the first zone 180.

According to various embodiments, the processor 220 may prestore a communication signal pattern for the presence of a specific user in the first zone 180. For example, referring to FIG. 6B(b), the processor 220 may store the pattern of the communication signal TS1 in the memory 230 when the first user 111 exists in the first zone 180. When the processor 220 receives the first communication signal TS having a pattern identical or similar to the pattern of the communication signal TS1, the processor 220 may determine that the first user 111 exists in the first zone 180. Alternatively, referring to FIG. 6B(c), the processor 220 may prestore the pattern of the communication signal TS2 in the memory 230 when the second user 112 exists in the first zone 180. When receiving the first communication signal TS having a pattern identical or similar to the pattern of the communication signal TS2, the processor 220 may determine that the second user 112 exists in the first zone 180.

The first electronic device 101 may also identify which user exists in the first zone 180 by the above-described method. The above-described method may be applied in the same manner when a user existing in the second zone 190 is identified.

The above-described method may have a small security issue relative to an existing method of identifying a user by capturing the user with a camera. In addition, the above-described method may also be applicable even when a user does not carry a terminal, compared to an existing method of identifying a user by identifying the position of a terminal.

Figure 7:
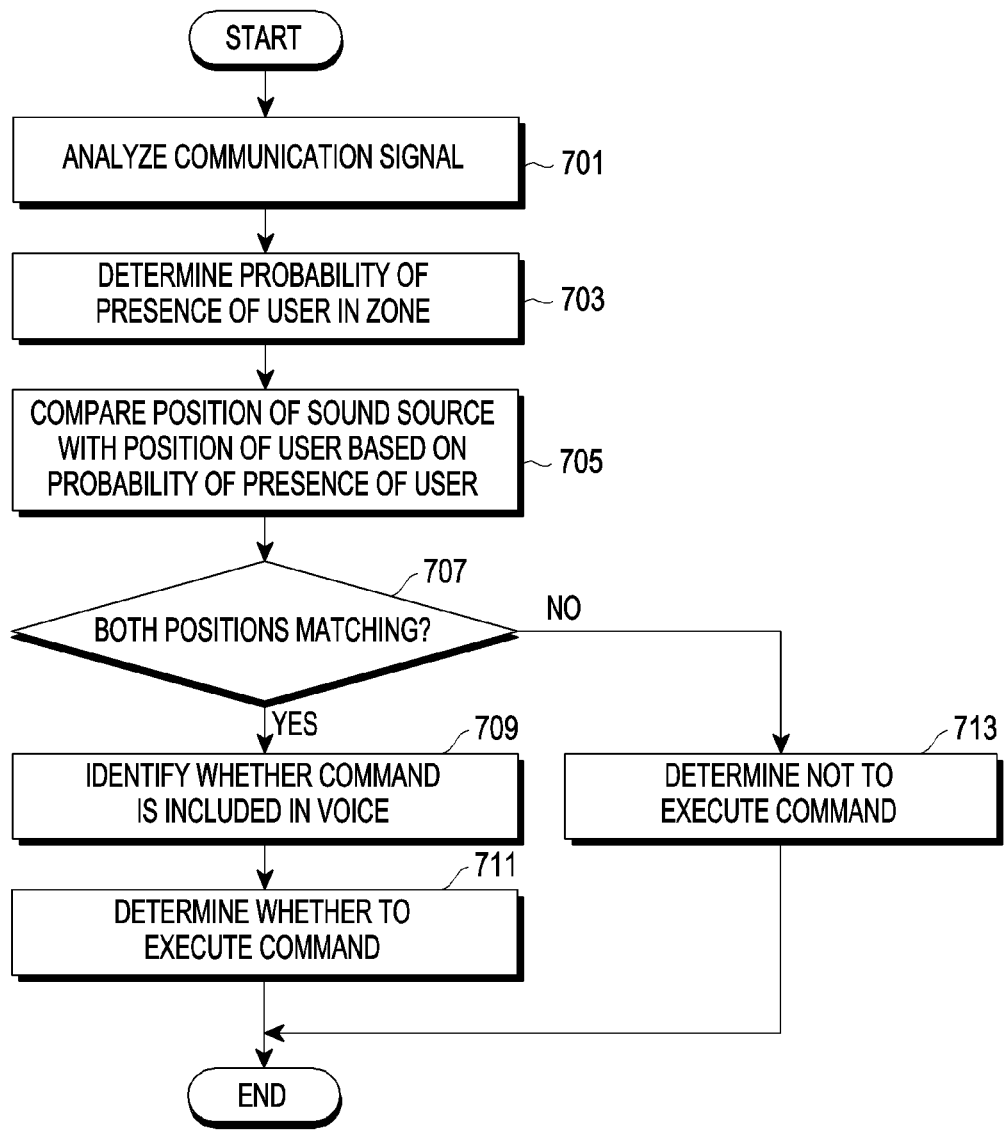
FIG. 7 is a flowchart illustrating a method of determining whether to execute a command by a first electronic device according to various embodiments.

FIG. 7 is a flowchart illustrating a method of determining whether to execute a command by a first electronic device according to various embodiments.

Referring to FIG. 7, according to various embodiments, a first electronic device (for example, the first electronic device 101 in FIG. 1) may analyze a communication signal received from the third electronic device 104 in operation 701. For example, the communication signal may be a signal related to Wi-Fi communication technology.

According to various embodiments, the first electronic device 101 may determine the probability of the presence of a user in a first zone (for example, the first zone 180 in FIG. 1) in operation 703. For example, as described before with reference to FIGS. 6A and 6B, the first electronic device 101 may compare the communication signal with a reference communication signal to determine the probability of the presence of a user in the first zone 180. For example, the first electronic device 101 may determine the probability of the presence of a user in the first zone 180 based on the difference between the communication signal and the reference communication signal. For example, when the difference between the communication signal and the reference communication signal is equal to or greater than a preset value, the first electronic device 101 may determine the probability of the presence of a user in the first zone 180 to be a high value. On the other hand, when there is little difference between the communication signal and the reference communication signal, the first electronic device 101 may determine the probability of the presence of a user in the first zone 180 to be a low value.

According to various embodiments, the first electronic device 101 may compare the position of a sound source with the position of a user based on the probability of the presence of a user in the first zone 180 in operation 705. For example, when the probability of the presence of a user in the first zone 180 is higher than a preset value, the first electronic device 101 may determine that the user exists in the first zone 180. Further, for example, when the probability of the absence of a user in the first zone 180 is higher than a preset value, the first electronic device 101 may determine that a user does not exist in the first zone 180. The first electronic device 101 may determine the position of the user in consideration of the probability of the presence of a user in the first zone 180. The first electronic device 101 may compare the determined position of the user with the position of the sound source. For example, the position of the sound source may be determined in the method described before with reference to FIG. 4.

According to various embodiments, in operation 707, the first electronic device 101 may identify whether the two positions (the position of the sound source and the position of the user) match. For example, the first electronic device 101 may identify whether the two positions (the position of the sound source and the position of the user) match within a preset range. For example, the preset range may be a range in which the two positions may be regarded as substantially the same or similar. In this case, the preset range may be automatically set by a processor (for example, the processor 220 in FIG. 3) or may be set by a user input.

According to various embodiments, when the two positions match (Yes in operation 707), the first electronic device 101 may identify whether a command is included in voice obtained through a plurality of microphones (for example, the plurality of microphones 251 to 254 in FIG. 3) in operation 709. For example, the command may mean a voice command, and the voice command may be automatically set by the processor 220 or may be set by a user input.

According to various embodiments, the first electronic device 101 may determine whether to execute the command in operation 711. For example, when a command is included in the voice, the first electronic device 101 may execute a function corresponding to the command. Alternatively, for example, when the command is included in the voice, the first electronic device 101 may execute the function corresponding to the command, when a specified condition (for example, a condition that the voice matches the voice of a preregistered user) is satisfied.

According to various embodiments, when the two positions do not match (No in operation 707), the first electronic device 101 may determine not to execute the command in operation 713. Alternatively, the first electronic device 101 may determine that the voice does not contain a command. That is, the first electronic device 101 may not execute a function (for example, wake-up function) corresponding to a command (for example, wake-up command).

Figure 8:
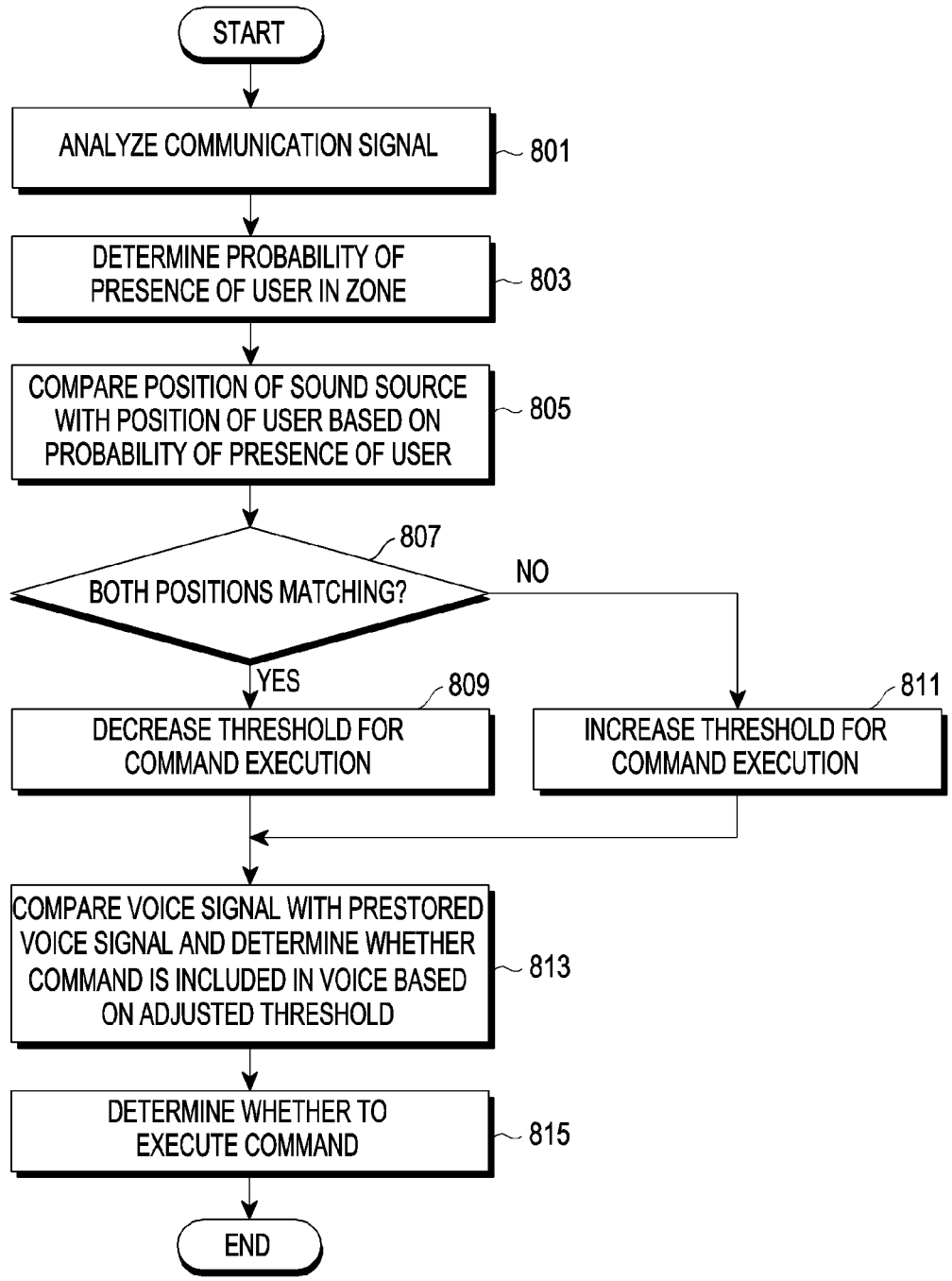
FIG. 8 is a flowchart illustrating a method of determining whether to execute a command by a first electronic device according to various embodiments.

FIG. 8 is a flowchart illustrating a method of determining whether to execute a command by a first electronic device according to various embodiments.

Referring to FIG. 8, according to various embodiments, a first electronic device (for example, the first electronic device 101 in FIG. 1) may analyze a communication signal received from the third electronic device 104 in operation 801. For example, the communication signal may be a signal related to Wi-Fi communication technology.

According to various embodiments, the first electronic device 101 may determine the probability of the presence of a user in a first zone (for example, the first zone 180 in FIG. 1) in operation 803. For example, the probability of the presence of a user may be determined in the same manner as in operation 703 of FIG. 7 described above.

According to various embodiments, the first electronic device 101 may compare the position of a sound source with the position of a user based on the probability of the presence of a user in the first zone 180 in operation 805. For example, the position of a sound source may be compared with the position of a user in the same manner as in operation 705 of FIG. 7 described above.

According to various embodiments, the first electronic device 101 may identify whether the two positions (the position of the sound source and the position of the user) match in operation 807. For example, the first electronic device 101 may identify whether the two positions (the position of the sound source and the position of the user) match within a preset range. For example, the preset range may be a range in which the two positions may be considered to be substantially identical or similar. In this case, the preset range may be automatically set by a processor (for example, the processor 220 in FIG. 3) or may be set by a user input.

According to various embodiments, when the positions match (Yes in operation 807), the first electronic device 101 may decrease a threshold for command execution in operation 809. For example, when the threshold is decreased, the sensitivity for determining whether a command is included in voice may be set to be high.

According to various embodiments, when the two positions do not match (No in operation 807), the first electronic device 101 may increase the threshold for command execution in operation 811. For example, when the threshold is increased, the sensitivity for determining whether a command is included in voice may be set to be low.

According to various embodiments, the first electronic device 101 may compare voice signals corresponding to voice obtained through a plurality of microphones (for example, the plurality of microphones 251 to 254 in FIG. 3) with a voice signal of a user whose information is prestored in operation 813. Further, the first electronic device 101 may determine whether a command is included in the voice based on the adjusted threshold.

According to various embodiments, the first electronic device 101 may determine whether to execute the command in operation 815. For example, when the command is included in the voice, the first electronic device 101 may execute a function corresponding to the command. Alternatively, for example, when the voice includes a command and a specified condition (for example, a condition that the voice matches the voice of a preregistered user) is satisfied, the first electronic device 101 may execute the function (for example, wake-up function) corresponding to the command (for example, wake-up command). Alternatively, when determining that a command is not included in the voice, the first electronic device 101 may not execute a function (for example, wake-up function) corresponding to a command (for example, wake-up command).

Figure 9:
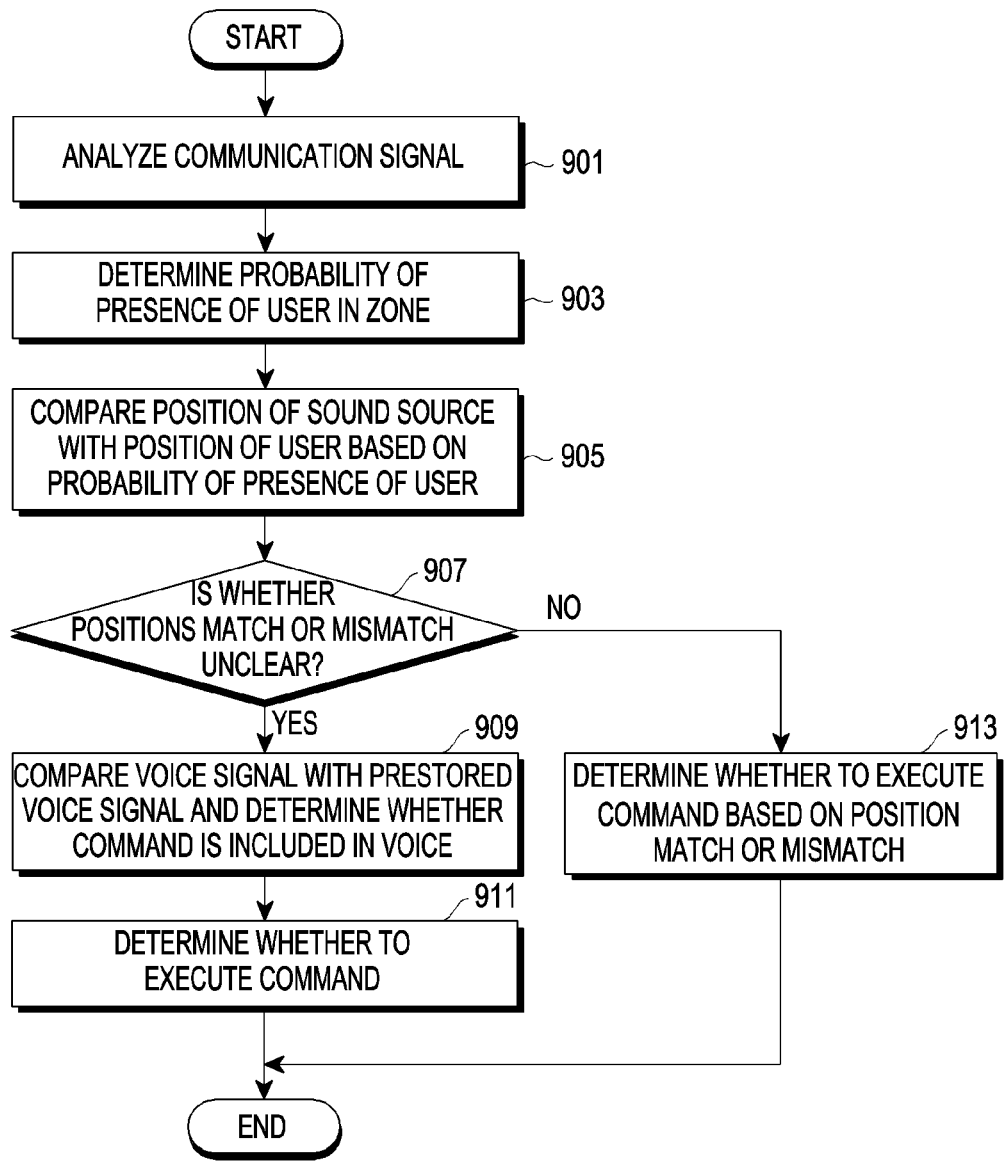
FIG. 9 is a flowchart illustrating a method of determining whether to execute a command by a first electronic device according to various embodiments.

FIG. 9 is a flowchart illustrating a method of determining whether to execute a command by a first electronic device according to various embodiments.

Referring to FIG. 9, according to various embodiments, a first electronic device (for example, the first electronic device 101 in FIG. 1) may analyze a communication signal received from the third electronic device 104 in operation 901. For example, the communication signal may be a signal related to Wi-Fi communication technology.

According to various embodiments, the first electronic device 101 may determine the probability of the presence of a user in a first zone (for example, the first zone 180 in FIG. 1) in operation 903. For example, the probability of the presence of a user may be determined in the same manner as in operation 703 of FIG. 7 described above.

According to various embodiments, the first electronic device 101 may compare the position of a sound source with the position of a user based on the probability of the presence of a user in the first zone 180 in operation 905. For example, the position of the sound source may be compared with the position of the user in the same manner as in operation 705 of FIG. 7 described above.

According to various embodiments, the first electronic device 101 may identify whether it is unclear whether the two positions (the position of the sound source and the position of the user) match in operation 907. For example, when the position of the user and/or the position of the sound source is not included in a zone available for determination (for example, the first zone 180 and the second zone 190), the first electronic device 101 may determine that it is unclear whether the positions match.

According to various embodiments, when it is unclear whether the two positions match (Yes in operation 907), the first electronic device 101 may compare the voice signal with a prestored voice signal and determine whether a command is included in the voice in operation 909. For example, when it is unclear whether the two positions match, the first electronic device 101 may determine whether a command is included in the voice using an automatic speech recognition (ASR) module.

According to various embodiments, the first electronic device 101 may determine whether to execute a command based on the result of the determination as to whether a command is included in the voice in operation 911. For example, when a command is included in the voice, the first electronic device 101 may execute a function (for example, wake-up function) corresponding to the command (for example, wake-up command). Alternatively, when determining that a command is not included in the voice, the first electronic device 101 may not execute a function (for example, wake-up function) corresponding to a command (for example, wake-up command).

According to various embodiments, when it is clear whether the two positions match (No in operation 907), the first electronic device 101 may determine whether to execute the command according to whether the two positions match in operation 913. For example, it may be determined whether to execute a command in the methods of determining whether to execute a command described with reference to FIGS. 7 and 8.

Figure 10:
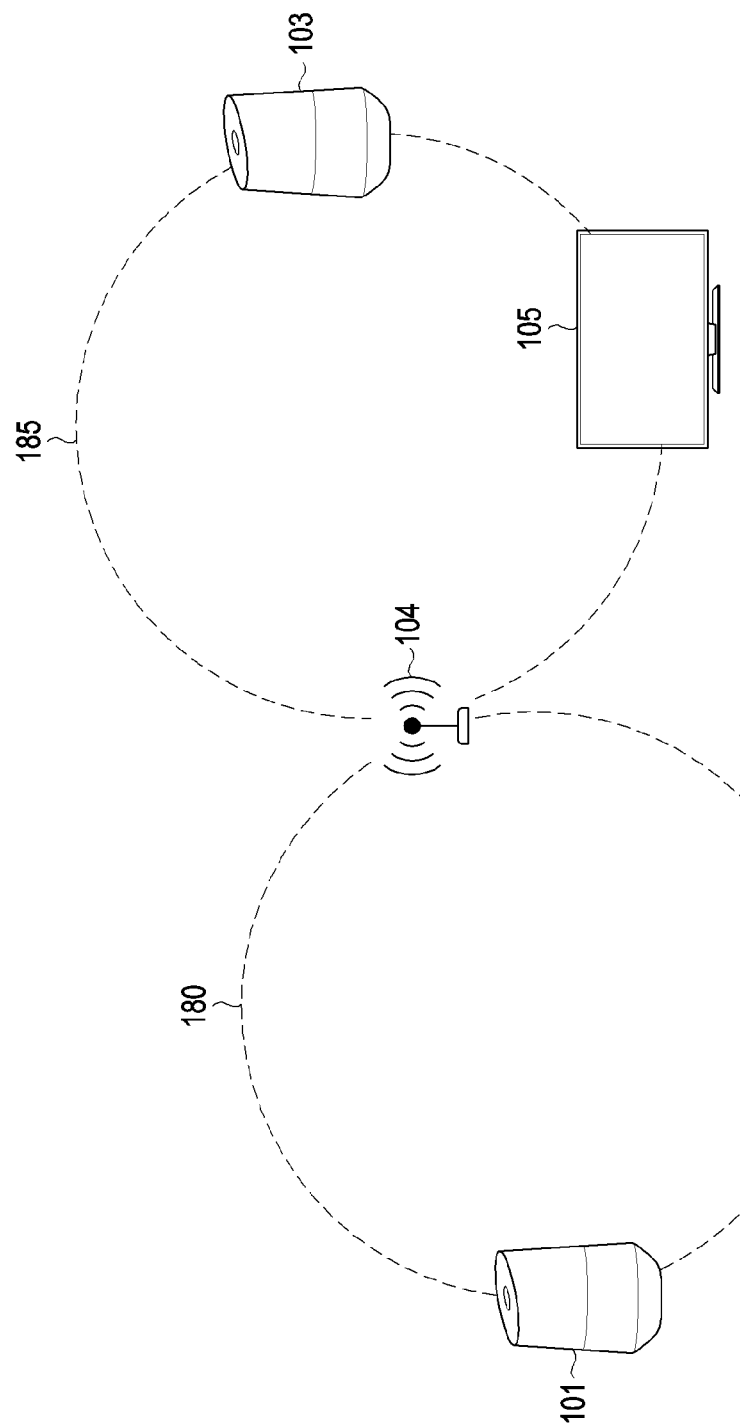
FIG. 10 is a diagram illustrating an electronic system according to various embodiments.

FIG. 10 is a diagram illustrating an electronic system according to various embodiments.

Referring to FIG. 10, the electronic system may include the first electronic device 101, the third electronic device 104, a fourth electronic device 103, and a fifth electronic device 105. For example, the electronic system of FIG. 10 may further include the fourth electronic device 103 and the fifth electronic device 105, compared to the electronic system of FIG. 1.

According to various embodiments, the first electronic device 101 may receive a communication signal of a wireless communication technology from a plurality of external electronic devices (for example, the third electronic device 104, the fourth electronic device 103, and the fifth electronic device 105).

According to various embodiments, the first electronic device 101 may locate the plurality of external electronic devices (for example, the third electronic device 104, the fourth electronic device 103, and the fifth electronic device 105). Further, according to various embodiments, the fourth electronic device 103 may locate a plurality of external electronic devices (for example, the first electronic device 101, the third electronic device 104, and the fifth electronic device 105). For example, the first electronic device 101 and the fourth electronic device 104 may be the same device. Alternatively, the first electronic device 101 and the fourth electronic device 103 may be devices capable of executing the same function.

According to various embodiments, the first electronic device 101 may receive external voice and determine whether the received voice includes a command that commands the first electronic device 101 to execute a function. The first electronic device 101 may identify the position of a sound source from which the voice has been output. The first electronic device 101 may analyze a communication signal to determine whether a user is located in the first zone 180 and/or a second zone (for example, the second zone 190 in FIG. 1).

According to various embodiments, the fourth electronic device 103 may receive external voice and determine whether the received voice includes a command commanding the fourth electronic device 103 to execute a function. The fourth electronic device 103 may identify the position of a sound source from which the voice has been output. The fourth electronic device 103 may determine whether a user is located in a third zone 185 by analyzing the communication signal.

According to various embodiments, the first electronic device 101 may determine whether to execute the function corresponding to the command included in the voice. For example, the first electronic device 101 may receive command execution-related information from the fourth electronic device 103. The first electronic device 101 may determine whether to execute the function corresponding to the command included in the voice, based on the command execution-related information received from the fourth electronic device 103. The command execution-related information may be information indicating whether a user exists in the third zone 185, identified by the fourth electronic device 103. Alternatively, the command execution-related information may be information (for example, signal-to-noise ratio (SNR) information) about the communication signal measured by the fourth electronic device 103.

Figure 11:
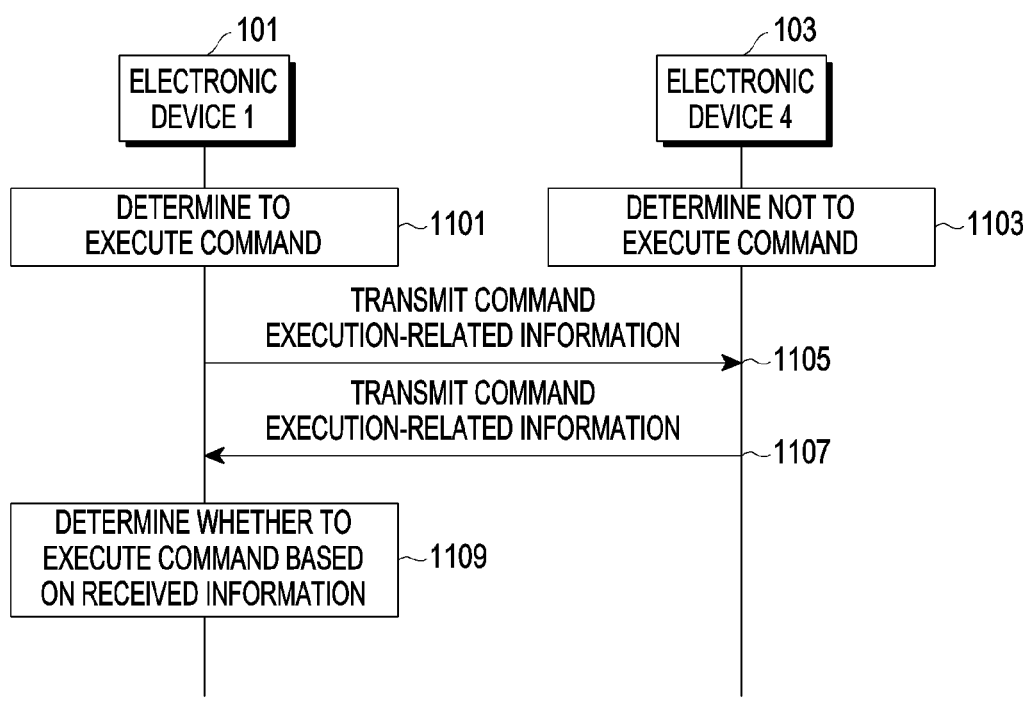
FIG. 11 is a diagram illustrating operations of a first electronic device and a fourth electronic device according to various embodiments.

FIG. 11 is a diagram illustrating operations of a first electronic device and a fourth electronic device according to various embodiments.

Referring to FIG. 11, according to various embodiments, the first electronic device 101 may determine whether to execute a command included in voice. For example, the first electronic device 101 may determine to execute a function (for example, a wake-up function) corresponding to the command in operation 1101. For example, the first electronic device 101 may determine whether to execute a command included in voice in the above-described methods.

According to various embodiments, the fourth electronic device 103 may determine whether to execute the command included in the voice. For example, the fourth electronic device 103 may analyze a communication signal from the third electronic device 104 and determine that a user does not exist in a third zone (for example, the third zone 185 in FIG. 10) according to the result of the analysis in operation 1103. The fourth electronic device 103 may determine not to execute a function (for example, wake-up function) corresponding to the command according to the result of the determination. For example, the fourth electronic device 103 may determine whether to execute the command included in the voice in the above-described methods of determining whether to execute a command included in voice by the first electronic device 101.

According to various embodiments, the first electronic device 101 may transmit command execution-related information to the fourth electronic device 103 in operation 1105. Alternatively, the first electronic device 101 may broadcast the command execution-related information. For example, the command execution-related information may be information about the voice obtained by the first electronic device 101 (for example, SNR information about the voice signal). For example, as the command execution is determined, the first electronic device 101 may transmit command execution-related information to the fourth electronic device 103. For example, the fourth electronic device 103 may determine whether to execute the command again, based on command execution-related information received from the first electronic device 101.

According to various embodiments, the fourth electronic device 103 may transmit command execution-related information to the first electronic device 101 in operation 1107. Alternatively, the fourth electronic device 103 may broadcast the command execution-related information. For example, the command execution-related information may be information about the voice obtained by the fourth electronic device 103 (for example, SNR information about the voice signal). For example, when the execution of the command is determined, the fourth electronic device 103 may transmit or broadcast the command execution-related information to the first electronic device 101.

According to various embodiments, in operation 1109, the first electronic device 101 may determine whether to execute the command again, based on the command execution-related information received from the fourth electronic device 103. For example, the first electronic device 101 may compare the voice signal that the first electronic device 101 used to determine the position of the sound source with the voice signal obtained by the fourth electronic device 103, and determine again whether to execute the command based on the result of the comparison.

According to various embodiments, the first electronic device 101 may determine that the voice has been output from a fifth electronic device (for example, the fifth electronic device 105 in FIG. 10) based on the voice signal obtained by the fourth electronic device 103. In this case, the first electronic device 101 may not execute the function corresponding to the command. On the other hand, the first electronic device 101 may determine that the voice has been uttered by the user based on the voice signal obtained by the fourth electronic device 103. In this case, the first electronic device 101 may execute the function corresponding to the command.

Figure 12:
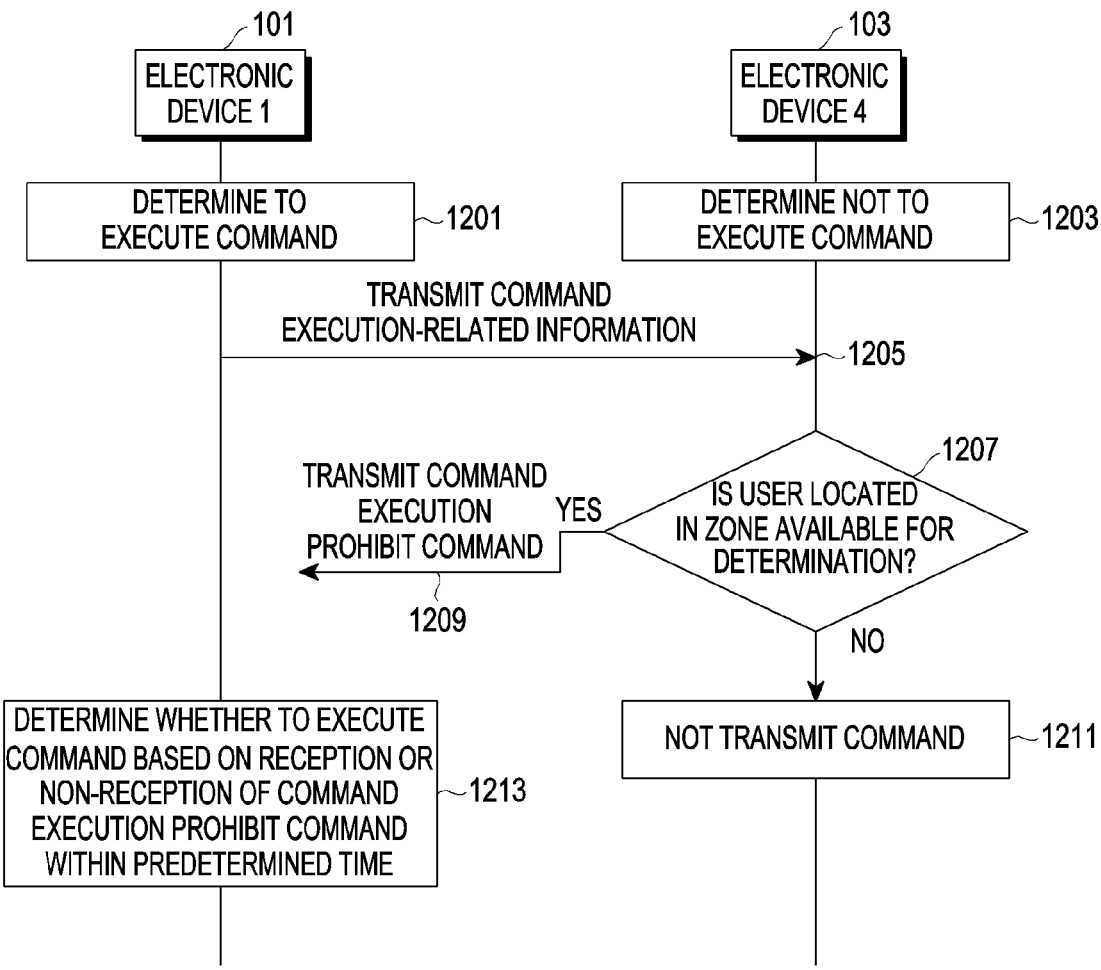
FIG. 12 is a diagram illustrating operations of a first electronic device and a fourth electronic device according to various embodiments.

FIG. 12 is a diagram illustrating operations of a first electronic device and a fourth electronic device according to various embodiments.

Referring to FIG. 12, according to various embodiments, the first electronic device 101 may determine whether to execute a command included in voice. For example, the first electronic device 101 may determine to execute a function (for example, wake-up function) corresponding to the command in operation 1201. For example, the first electronic device 101 may determine whether to execute the command included in the voice according to the above-described methods.

According to various embodiments, the fourth electronic device 103 may determine whether to execute the command included in the voice. For example, the fourth electronic device 103 may determine not to execute the function (for example, wake-up function) corresponding to the command in operation 1203. For example, the fourth electronic device 103 may determine whether to execute the command included in the voice according to the above-described methods of determining whether to execute a command included in voice by the first electronic device 101.

According to various embodiments, when the fourth electronic device 103 receives command execution-related information from the first electronic device 101, the fourth electronic device may determine whether a user exists in a zone available for determination (for example, the third zone 185 in FIG. 10) in operation 1205. For example, the fourth electronic device 103 may analyze a communication signal from the third electronic device 104 and determine whether a user exists in the third zone 185 according to the result of the analysis.

According to various embodiments, when determining that a user exists in the third zone 185 (Yes in operation 1207), the fourth electronic device 103 may transmit a command execution prohibit command to the first electronic device 101 in operation 1209. Alternatively, when determining that a user does not exist in the third zone 185 (No in operation 1207), the fourth electronic device 103 may not transmit the command execution prohibit command to the first electronic device 101 in operation 1211.

According to various embodiments, the first electronic device 101 may finally determine whether to execute the command according to whether the command execution prohibit command has been received from the fourth electronic device 103 within a predetermined time in operation 1213. For example, upon receipt of the command execution prohibit command within the predetermined time, the first electronic device 101 may not execute a function (for example, wake-up function) corresponding to the command. For example, upon receipt of the command execution prohibit command within the predetermined time after transmitting the command execution-related information, the first electronic device 101 may execute the function (for example, wake-up function) corresponding to the command.

Figure 13:
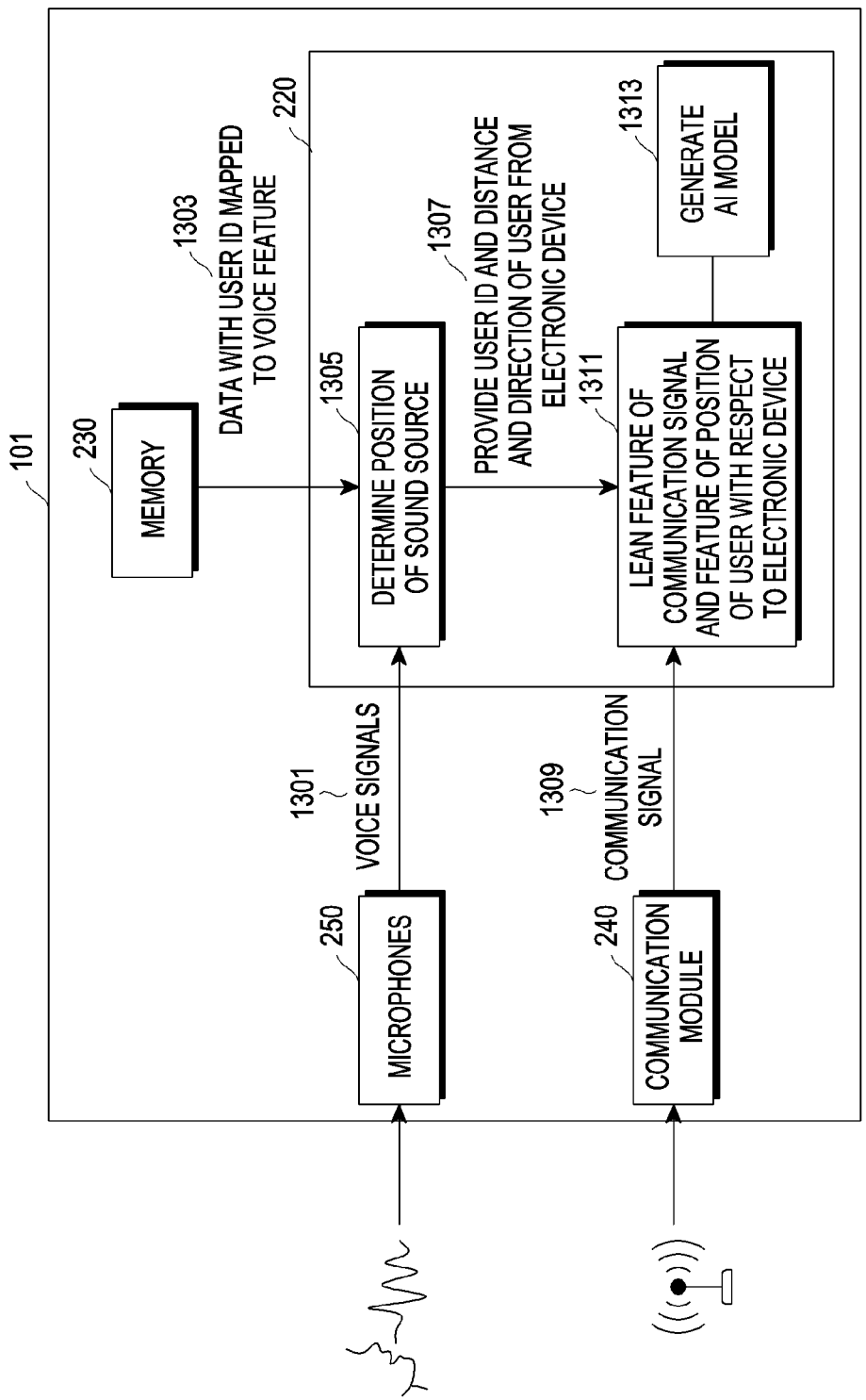
FIG. 13 is a block diagram illustrating an operation of a first electronic device according to various embodiments.

FIG. 13 is a block diagram illustrating an operation of a first electronic device according to various embodiments.

Referring to FIG. 13, according to various embodiments, the first electronic device 101 may receive voice through microphones 250 and transmit voice signals corresponding to the voice to the processor 220 in operation 1301.

According to various embodiments, the processor 220 may obtain data in which a user identifier (ID) is mapped to a voice feature, stored in the memory 230 in operation 1303.

According to various embodiments, the processor 220 may determine the position of a sound source in operation 1305. In this case, the processor 220 may determine the position of the sound source as that of a user.

According to various embodiments, the processor 220 may identify the user ID of the user corresponding to the voice signal, and identify the direction and distance in which the user is located with respect to the position of the first electronic device 101 in operation 1307.

According to various embodiments, the processor 220 may receive a communication signal from a third electronic device (for example, the third electronic device 104 in FIG. 1) through the communication module 240 in operation 1309. The processor 220 may analyze the communication signal.

According to various embodiments, the processor 220 may learn the user ID and the direction and distance of the user corresponding to the user ID in association with the communication signal in operation 1311. For example, when a user is located in a specific direction at a specific distance, the processor 220 may learn whether a communication signal having a specific pattern is received.

According to various embodiments, the processor 220 may generate an AI model by which the user ID based on the communication signal and the position (for example, the direction and distance with respect to the first electronic device) of the user corresponding to the user ID may be determined, based on the learning result in operation 1313. Even though the user does not command by voice, the processor 220 may determine the user ID corresponding to the user and the position of the user by using the generated AI model.

The first electronic device 101 according to various embodiments may be implemented in the same manner as or similar to a later-described electronic device 1401 illustrated in FIG. 14.

Figure 14:
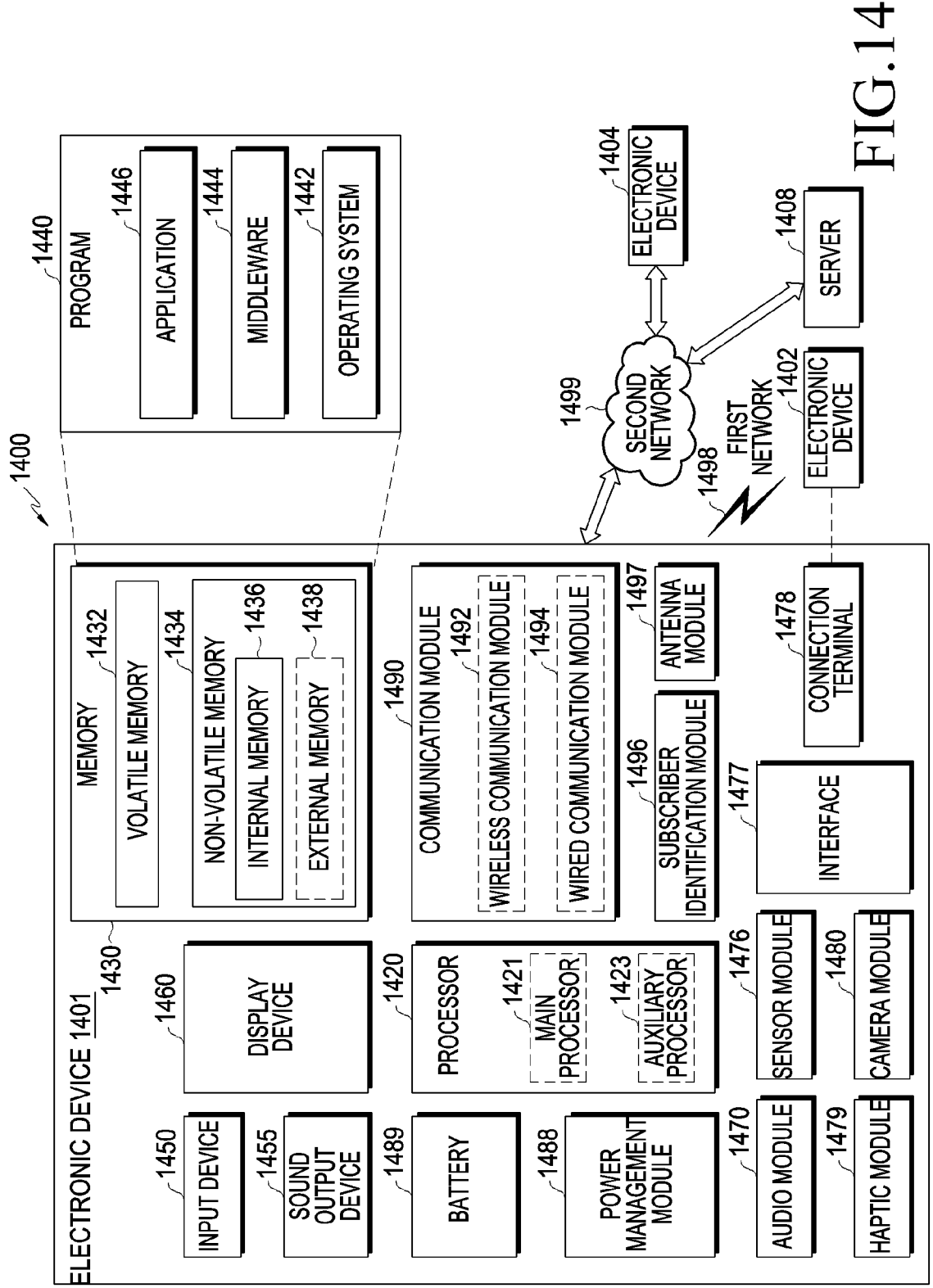
FIG. 14 is a block diagram illustrating an electronic device in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

According to various embodiments, an electronic device may include a communication module, a plurality of microphones, and a processor. The processor may be configured to identify a position of a sound source based on a voice received through the plurality of microphones, identify whether the position of the sound source is included in a first zone between the electronic device and an access point that transmits and receives a communication signal with the electronic device, identify whether the voice has been uttered by a user based on a comparison between the communication signal and a preset communication signal, when the position of the sound source is included in the first zone, and determine whether to execute a command included in the voice based on the identification of whether the voice has been uttered by the user.

The processor may be configured to identify a position of the user in the first zone based on the comparison, and identify whether the voice has been uttered by the user by comparing the position of the user with the position of the sound source.

When the position of the user matches the position of the sound source, the processor may be configured to determine whether to execute the command by comparing the voice with a prestored voice signal of the user.

When the position of the user matches the position of the sound source, the processor may be configured to decrease a threshold for executing the command included in the voice by comparing the voice with a prestored voice signal of the user.

When the position of the user does not match the position of the sound source, the processor may be configured to increase a threshold for executing the command included in the voice by comparing the voice with a prestored voice signal of the user.

When the position of the user does not match the position of the sound source, the processor may be configured not to execute the command.

After determining to execute the command, the processor may be configured to transmit information related to execution of the command to at least one external electronic device.

The processor may be configured to receive information related to execution of the command from at least one external electronic device and determine whether to execute the command based on the received information.

When the position of the sound source is not included in the first zone, the processor may be configured to identify whether a command is included in the voice, and when the command is included in the voice, the processor may be configured to execute a function corresponding to the command.

The command may include a command for waking up the electronic device.

According to various embodiments, a method of operating an electronic device may include identifying a position of a sound source based on a voice received through a plurality of microphones included in the electronic device, identifying whether the position of the sound source is included in a first zone between the electronic device and an access point that transmits and receives a communication signal with the electronic device, identifying whether the voice has been uttered by a user based on a comparison between the communication signal and a preset communication signal, when the position of the sound source is included in the first zone, and determining whether to execute a command included in the voice based on the identification of whether the voice has been uttered by the user.

Identifying whether the voice has been uttered by a user may include identifying a position of the user in the first zone, and identifying whether the voice has been uttered by the user by comparing the position of the user with the position of the sound source.

Determining whether to execute a command included in the voice may include, when the position of the user matches the position of the sound source, determining whether to execute the command by comparing the voice with a prestored voice signal of the user.

The method may further include, when the position of the user matches the position of the sound source, decreasing a threshold for executing the command included in the voice by comparing the voice with a prestored voice signal of the user.

The method may further include, when the position of the user does not match the position of the sound source, increasing a threshold for executing the command included in the voice by comparing the voice with a prestored voice signal of the user.

Determining whether to execute a command included in the voice may include, when the position of the user does not match the position of the sound source, not executing the command.

The method may further include transmitting information related to execution of the command to at least one external electronic device, after determining to execute the command.

Determining whether to execute a command included in the voice may include receiving information related to execution of the command from at least one external electronic device, and determining whether to execute the command based on the received information.

The method may further include, when the position of the sound source is not included in the first zone, identifying whether a command is included in the voice, and when the command is included in the voice, executing a function corresponding to the command.

According to various embodiments, an electronic device may include a memory and a processor. The memory may store instructions which when executed, cause the processor to identify a position of a sound source based on a voice received through a plurality of microphones included in the electronic device, identify whether the position of the sound source is included in a first zone between the electronic device and an access point that transmits and receives a communication signal with the electronic device, identify whether the voice has been uttered by a user based on a comparison between the communication signal and a preset communication signal, when the position of the sound source is included in the first zone, and determine whether to execute a command included in the voice based on the identification of whether the voice has been uttered by the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

The invention claimed is:
1. An electronic device comprising:
a communication module;
a plurality of microphones; and
a processor,
wherein the processor is configured to:
identify a position of a sound source based on a voice received through the plurality of microphones;
identify whether the position of the sound source is included in a first zone between the electronic device and an access point wirelessly connected with the electronic device, wherein the first zone includes a path through which a communication signal is transmitted from the access point to the electronic device;
identify whether a position of a user is included in the first zone based on a comparison between the communication signal received from the access point and a preset communication signal stored in the electronic device, when the position of the sound source is included in the first zone, wherein when the user is in the first zone, the communication signal does not correspond to the preset communication signal due to a user's interference;
based on identifying that the position of the user is included in the first zone, determine to execute a command included in the voice; and based on identifying that the position of the user is not included in the first zone, determine to refrain from executing the command included in the voice.

2. The electronic device according to claim 1, wherein the processor is further configured to:
identify whether the voice has been uttered by the user by comparing the position of the user with the position of the sound source.

3. The electronic device according to claim 2, wherein when the position of the user matches the position of the sound source, the processor is further configured to determine whether to execute the command by comparing the voice with a prestored voice signal of the user.

4. The electronic device according to claim 2, wherein when the position of the user matches the position of the sound source, the processor is further configured to decrease a threshold for executing the command included in the voice by comparing the voice with a prestored voice signal of the user.

5. The electronic device according to claim 2, wherein when the position of the user does not match the position of the sound source, the processor is further configured to increase a threshold for executing the command included in the voice by comparing the voice with a prestored voice signal of the user.

6. The electronic device according to claim 2, wherein when the position of the user does not match the position of the sound source, the processor is further configured not to execute the command.

7. The electronic device according to claim 1, wherein after determining to execute the command, the processor is further configured to transmit information related to execution of the command to at least one external electronic device.

8. The electronic device according to claim 1, wherein the processor is further configured to:
receive information related to execution of the command from at least one external electronic device, and
determine whether to execute the command based on the received information.

9. The electronic device according to claim 1, wherein the processor is further configured to:
when the position of the sound source is not included in the first zone, identify whether the command is included in the voice, and
when the command is included in the voice, execute a function corresponding to the command.

10. The electronic device according to claim 1, wherein the command includes a command for waking up the electronic device.

11. A method of operating an electronic device, the method comprising:
identifying a position of a sound source based on a voice received through a plurality of microphones included in the electronic device;
identifying whether the position of the sound source is included in a first zone between the electronic device and an access point wirelessly connected with the electronic device, wherein the first zone includes a path through which a communication signal is transmitted from the access point to the electronic device;
identifying whether a position of a user is included in the first zone based on a comparison between the communication signal received from the access point and a preset communication signal stored in the electronic device, when the position of the sound source is included in the first zone, wherein when the user is in the first zone, the communication signal does not correspond to the preset communication signal due to a user's interference;
based on identifying that the position of the user is included in the first zone, determining to execute a command included in the voice; and
based on identifying that the position of the user is not included in the first zone, determine to refrain from executing the command included in the voice.

12. The method according to claim 11, further comprising:
identifying whether the voice has been uttered by the user by comparing the position of the user with the position of the sound source.

13. The method according to claim 12, wherein determining whether to execute the command included in the voice comprises:
when the position of the user matches the position of the sound source, determining to execute the command by comparing the voice with a prestored voice signal of the user.

14. The method according to claim 12, further comprising:
when the position of the user matches the position of the sound source, decreasing a threshold for executing the command included in the voice by comparing the voice with a prestored voice signal of the user.

15. The method according to claim 12, further comprising:
when the position of the user does not match the position of the sound source, increasing a threshold for executing the command included in the voice by comparing the voice with a prestored voice signal of the user.

* * * * *